Figure 1:
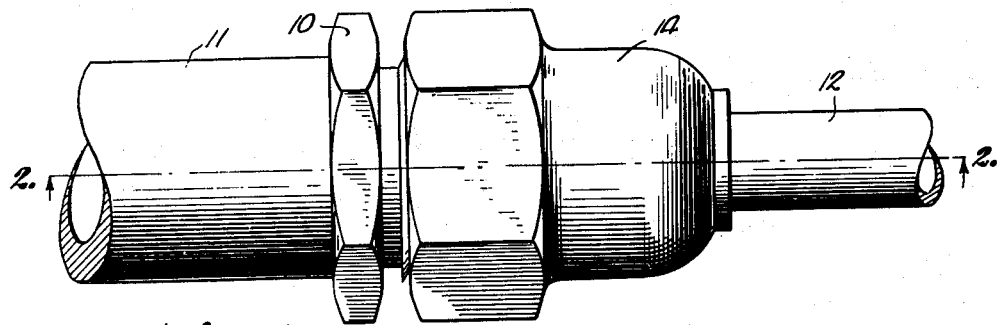

Aug. 16, 1949.     V. T. BOTTING     2,479,058
FLEXIBLE COUPLING
Filed Sept. 25, 1944

INVENTOR.
Vincent T. Botting
BY Thos E. Anfield
ATTORNEY.

Patented Aug. 16, 1949

2,479,058

UNITED STATES PATENT OFFICE 2,479,058

FLEXIBLE COUPLING

Vincent T. Botting, Scarsdale, N. Y., assignor to Gustin-Bacon Manufacturing Company, a corporation of Missouri Application September 25, 1944, Serial No. 555,670

4 Claims. (Cl. 285—90)

My invention relates to new and useful improvements in flexible couplings for metal or all types of tubing and pipe.

Light weight metal tubing is frequently used to conduct various fluids and gases at high pressures and under conditions where the tubing is subjected to continuous vibrations and compressional, tensional and flexing stresses or under conditions where it may have to withstand impacts or shocks. Examples are tubing installations in airplanes, ships, and railroad locomotives and cars. To withstand this abuse the lengths of tubing in the line are joined by couplings which permit at least a limited universal movement. However, to have practical utility the coupling must be fluid tight at relatively high pressures under the conditions described above and must be of relatively simple and inexpensive construction.

Heretofore, various types of flexible couplings have been devised but none of these have proven to be entirely satisfactory. Many of these couplings require mechanical preparation of the tube ends such as flaring, beading, grooving or the swaging on of a ferrule. These operations are difficult, tedious and time consuming. Furthermore, where relatively short sections of tubing are used or where the line is relatively long the cost of preparing the tube ends is prohibitive. Other couplings have been used which connect plain end tubes. The latter couplings commonly include either a rubber gasket or a metal ring to seal the joint between the coupling and the tube ends. However, a coupling employing a rubber gasket will not withstand tensional stresses or end pull, since the only hold on the tubing is the frictional engagement of the rubber gasket; and a coupling employing a metal sealing ring will not withstand vibration.

This invention is an improvement on the present types of plain end couplings. I provide gripping elements between the gasket and the tubing and a compression nut that can be tightened to sufficiently compress or squeeze the gasket so that the gripping elements bite into the tube sections. This eliminates preparation of the tube ends and provides a construction that will withstand considerable end pull and which will not be weakened or loosened by vibration. When the tubing, compression nut, gasket and gripping elements are combined and correlated in this manner the gripping elements have a positive gripping action on the tubing to resist end pull while the gasket holds the gripping elements securely in place and a resilient backing which allows slight motion without loosening. It has a further advantage in that the connection between the gripping elements and the tubing need not form a seal since the gasket contacts the tubing with sufficient force and over a sufficient area to provide an efficient high pressure seal.

An important object of my invention is to provide a flexible coupling that does not require mechanical preparation of the tube sections.

Another object of my invention is to provide a flexible coupling for plain end tubing that will withstand considerable vibration and end pull.

Still another object of my invention is to provide a flexible coupling that is simple in construction and inexpensive in operation.

Other objects and advantages of my invention will be apparent during the course of the following description.

Figure 2:
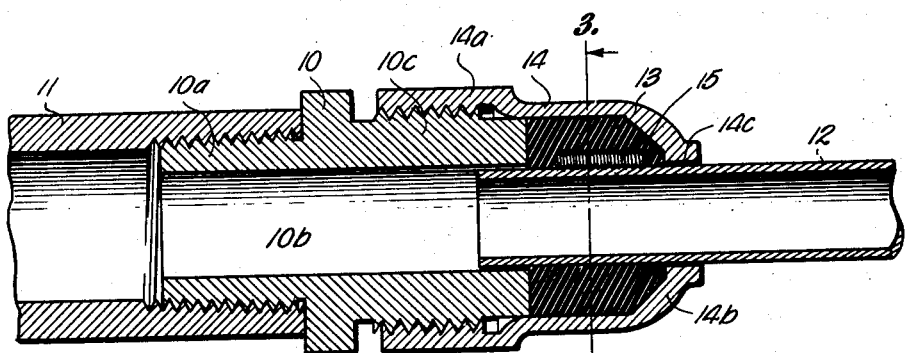
Figure 3:
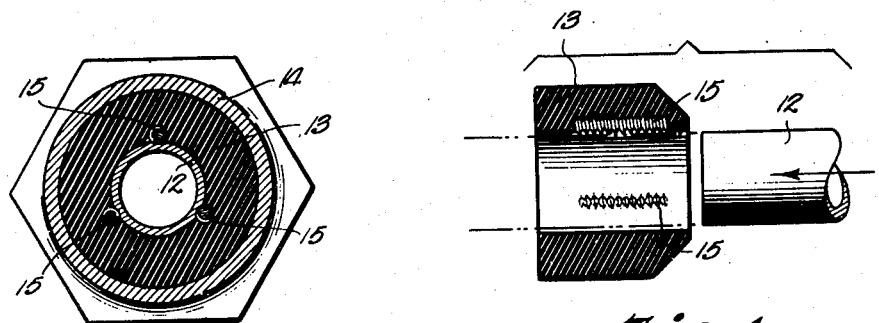
Figure 4:
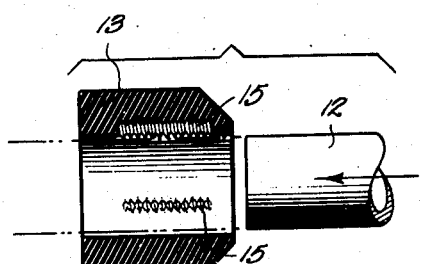

In the drawing forming a part of this specification and wherein like numerals are employed to designate like parts throughout the same, Fig. 1 is an elevational view showing a flexible coupling embodying my invention, Fig. 2 is a longitudinal sectional view taken on the line 2—2 of Fig. 1, Fig. 3 is a transverse sectional view taken on the line 3—3 of Fig. 2, and Fig. 4 is an exploded perspective view showing the relation between the gripping elements, gasket and tubing.

In the drawing wherein for the purpose of illustration is shown a preferred embodiment of my invention the numeral 10 designates a conventional nipple. The end 10a of the nipple is screwed into a pipe 11. The numeral 12 designates a section of plain end tubing which extends a short distance into the central passage 10b of the nipple. As shown in Fig. 2, the tubing 12 fits loosely within the passage. To seal the joint between the nipple 10 and tubing 12 I provide a gasket 13. The gasket surrounds tubing 12 and is confined at one end of the nipple 10 by a compression nut 14. The end 14a of the compression nut threadedly receives the end 10c of the nipple and the end 14b thereof is formed with a central opening 14c through which the tubing passes. When the compression nut 14 is tightened on the nipple the rubber gasket 13 is compressed or squeezed around the tubing. The gasket may be of natural or synthetic rubber or any other suitable material that can be deformed and which has the necessary resiliency. The gasket 13 provides a fluid tight seal between the nipple and the tubing but the compressional forces set up in the gasket do not create sufficient friction between the gasket and the tubing to overcome any substantial end pull on the tubing. I have found, however, that if gripping elements 15 are inserted between the gasket and the tubing of compressional forces created in the gasket by compression nut 14 are sufficient to cause the elements to bite into the tubing. In actual practice the gripping elements 15 do not bite deeply into the tubing but merely score its outer surface. However, even a relatively light scoring of the tubing provides substantial resistance to end pull. As best shown in Figs. 2 and 4, the gripping elements are preferably in the form of threaded studs. They may be molded into the gasket when it is formed or subsequently either threaded therein or placed in suitable recesses in its inner periphery. While I have shown the stripping elements in the form of threaded studs, it is to be understood that they may assume other shapes. The precise shape of the gripping elements is not important. It is sufficient that they contact the tubing and that the contacting surface be sufficiently rough or provided with teeth or serrations that will bite into the tubing. It is desirable that the gripping elements be transverse or substantially transverse to the tubing axis in order that they offer maximum resistance to end pull.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described my invention, I claim:

1. A flexible coupling for tubing comprising an externally threaded member, a compression nut threaded on said member having an opening, tubing extending into the nut through said opening, a gasket of resilient material confined within the nut and against one end of the externally threaded member, said gasket surrounding the tubing and compressed into frictional engagement therewith by the compression nut, and spaced apart tube gripping elements disposed circumferentially about the periphery of the tubing beneath and covered by the resilient gasket and lying between the gasket and the tubing said gripping elements urged forcibly against the tubing by compression of the gasket whereby said elements supplement the frictional retention of the tubing by the gasket with a positive holding action.

2. A flexible coupling for tubing comprising an externally threaded member, a compression nut threaded on said member having an opening, tubing extending into the nut through said opening, a gasket of resilient material confined within the nut and against one end of the externally threaded member, said gasket surrounding the tubing and compressed into frictional engagement therewith by the compression nut, a tube gripping element embedded within and covered by the resilient gasket and having teeth or serrations against the tubing whereby compressive forces imposed upon the gasket by the compression nut and externally threaded member cause, said teeth to bite into the tubing and providing a positive holding action.

3. A flexible coupling for tubing comprising an externally threaded member, a compression nut threaded on said member having an opening, tubing extending into the nut through said opening, a gasket of resilient material confined within the nut and against one end of the externally threaded member, said gasket surrounding the tubing and compressed into frictional engagement therewith by the compression nut, spaced apart externally threaded gripping elements beneath and covered by the resilient gasket and lying between the gasket and tubing, said elements disposed circumferentially about the periphery of the tubing and forced against the tubing by compressive forces imposed upon the gasket whereby the threads bite into the tubing.

4. A tube gripping and sealing assembly for use in flexible couplings and tube fittings with plain end tubes comprising a ring of resilient material, separate gripping elements spaced apart circumferentially about the inner periphery of the ring and covered by the resilient material of the ring, the inner diameter of the assembly being at least that of the tube upon which it is to be applied.

VINCENT T. BOTTING.

REFERENCES CITED

The following references are of record in the file of this patent:

UNITED STATES PATENTS

| Number | Name | Date |
| --- | --- | --- |
| 1,030,237 | Hall | June 18, 1912 |
| 1,823,061 | Pearson | Sept. 15, 1931 |
| 2,035,925 | Seamark | Mar. 31, 1936 |
| 2,212,745 | McIntosh | Aug. 27, 1940 |
| 2,232,513 | Confer | Feb. 18, 1941 |
| 2,283,975 | Dillon | May 26, 1942 |